US012726553B2

(12) United States Patent
Dong

(10) Patent No.: US 12,726,553 B2
(45) Date of Patent: Sep. 1, 2026

(54) PACKET CLASSIFIER WITH COMMUTABLE MATCHING TUPLE FEATURE

(71) Applicant: Lemon Inc., Grand Cayman (KY)

(72) Inventor: Xuanming Dong, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 411 days.

(21) Appl. No.: 18/346,524

(22) Filed: Jul. 3, 2023

(65) Prior Publication Data

US 2023/0344923 A1 Oct. 26, 2023

(51) Int. Cl.
*H04L 69/22* (2022.01)
*H04L 45/745* (2022.01)

(52) U.S. Cl.
CPC ........ *H04L 69/22* (2013.01); *H04L 45/74591* (2022.05)

(58) Field of Classification Search
CPC ............... H04L 69/22; H04L 45/74591; H04L 63/1408
See application file for complete search history.

(56) References Cited

U.S. PATENT DOCUMENTS

2014/0241361 A1* 8/2014 Bosshart ................. H04L 45/74 370/392
2014/0268971 A1* 9/2014 Bosshart ................ G11C 15/04 365/49.17
2015/0242429 A1* 8/2015 Varvello ............. H04L 45/7453 707/752
2019/0036821 A1* 1/2019 Levy ................... G06F 12/0868
2024/0223353 A1* 7/2024 Raman ................ H04L 49/3063

FOREIGN PATENT DOCUMENTS

KR 20040054110 A 6/2004
KR 20070003487 A 1/2007

OTHER PUBLICATIONS

Bosshart et al., "Forwarding Metamorphosis: Fast Programmable Match-Action Processing in Hardware for SDN", SIGCOMM'13, Aug. 12-16, 2023, http://yuba.stanford.edu/~grg/docs/sdn-chip-sigcomm-2013.pdf.
OpenFlow Switch Specification, Open Networking Foundation, Mar. 26, 2015, https://opennetworking.org/wp-content/uploads/2014/10/openflow-switch-v1.5.1.pdf.
Abdel-Hafeez et al., "An Efficient O(N) Comparison-Free Sorting Algorithm", Very Large Scale Integration (VLSI) Systems, IEEE Xplore, Feb. 22, 2017, https://ieeexplore.ieee.org/ielaam/92/7932577/7862290-aam.pdf.

(Continued)

*Primary Examiner* — Shawn D Miller
(74) *Attorney, Agent, or Firm* — Fish & Richardson P.C.

(57) ABSTRACT

A packet classifier for packet classification in computer networking is provided. The packet classifier includes a packet parser, an extended key crafting logic, a match and action table, and a rule parser configured to parse predetermined rules and to identify at least one commutable matching tuple. When the rule parser identifies the at least one commutable matching tuple in the predetermined rules, the rule parser actuates the extended key crafting logic and programs the match and action table based on the identified commutable matching tuple.

16 Claims, 6 Drawing Sheets

(56) References Cited

OTHER PUBLICATIONS

Rouf Ali, "Hardware Solution to Sorting Algorithms: A Review", Journal of Global Research in Computer Sciences, vol. 13 | Issue 1 | Feb. 24, 2022, https://www.rroij.com/open-access/hardware-solution-to-sorting-algorithms-a-review.php?aid=90998.
Digital comparator—Wikipedia, Jun. 29, 2023, https://en.wikipedia.org/wiki/Digital_comparator.
XOR swap algorithm—Wikipedia, Jun. 29, 2023, https://en.wikipedia.org/wiki/XOR_swap_algorithm.
Partial European Search Report for European Application No. 24184132.9, mailed Dec. 6, 2024, 12 pages.
Extended European Search Report in European Appln No. 24184132.9, dated Mar. 19, 2025, 14 pages.
Handbook of Applied Cryptography, 1st.ed., Menezes (ed)., Oct. 1996, Chapter 7, 61 pages.
Mohammed, "Implementation of Simplified Data Encryption Standard on FPGA using VHDL," Kurdistan Journal of Applied Research (KJAR), Jun. 2022, 7(1):9-20.

* cited by examiner

PACKET CLASSIFIER WITH COMMUTABLE MATCHING TUPLE FEATURE

FIELD

The embodiments described herein pertain generally to a packet classifier for packet classification in computer networking. More specifically, the embodiments described herein pertain to methods and systems for a packet classifier having a ternary content-addressable memory with a commutable matching tuple feature.

BACKGROUND

In computer networking, packet classification may refer to a process of identifying network data packets based on the multiple fields of the packet headers and applying corresponding actions. Packet classification may provide a mechanism to differentiate data packets and enable differentiated functionalities such as access control list, quality of service, net flow, intrusion detection system or prevention intrusion system, firewall, and/or other network services. In computer networking, packet classifier, a hardware functional block for packet classification, has recently become a crucial component of many networking hardware devices in modern data centers, including but not limited to network switches, routers, smart network interface card, security appliances, etc.

It is to be understood that packet classifiers may support either wildcard matching (e.g., longest-prefix matching, ternary matching, etc.) or exact matching via ternary content-addressable memory (TCAM). It is also to be understood that packet classifiers may support exact matching via hardware hashing modules. It is further to be understood that TCAM may be implemented on Application-Specific Integrated Circuits (ASIC), on Field-Programmable Gate Array (FPGA), or the like.

SUMMARY

It is to be understood that TCAM, a building block of a packet classifier, may be expensive and/or may have limited capacity and excessive power consumption, despite its capability for fast lookup speed. Features in the embodiments disclosed herein may improve the utilization of scarce resources such as the TCAM in a packet classifier.

Features in the embodiments disclosed herein may provide an enhanced hardware packet classifier to reduce memory usage and power consumption. Features in the embodiments disclosed herein may further provide a commutable matching tuple (e.g., a commutable matching tuple pair, a commutable matching tuple group, etc.) for the enhanced packet classifier to e.g., leverage an inherent symmetry of data packet flows to increase the TCAM utilization rate.

In one example embodiment, a packet classifier for packet classification in computer networking is provided. The packet classifier includes a packet parser, an extended key crafting logic, a match and action table, and a rule parser configured to parse predetermined rules and to identify at least one commutable matching tuple. When the rule parser identifies the at least one commutable matching tuple in the predetermined rules, the rule parser actuates the extended key crafting logic and programs the match and action table based on the identified commutable matching tuple.

In another example embodiment, an extended key crafting logic includes at least a pair of inputs, a comparator and swapper, at least a pair of multiplexers, an actuator, and a key crafting logic. When the actuator is enabled, the comparator and swapper generates results based on the pair of inputs, and the key crafting logic receives the results that pass through the pair of multiplexers.

In yet another example embodiment, a method for programming a ternary content-addressable memory (TCAM) is provided. The method includes paring a plurality of predetermined rules, identifying at least one commutable matching tuple in the predetermined rules, actuating an extended key crafting logic based on the identified at least one commutable matching tuple, and programming the TCAM based on the identified commutable matching tuple.

In yet another example embodiment, a non-transitory computer-readable medium having computer-executable instructions stored thereon is provided. The instructions, upon execution, cause one or more processors to perform operations including paring a plurality of predetermined rules, identifying at least one commutable matching tuple in the predetermined rules, actuating an extended key crafting logic based on the identified at least one commutable matching tuple, and programming a ternary content-addressable memory (TCAM) based on the identified commutable matching tuple.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
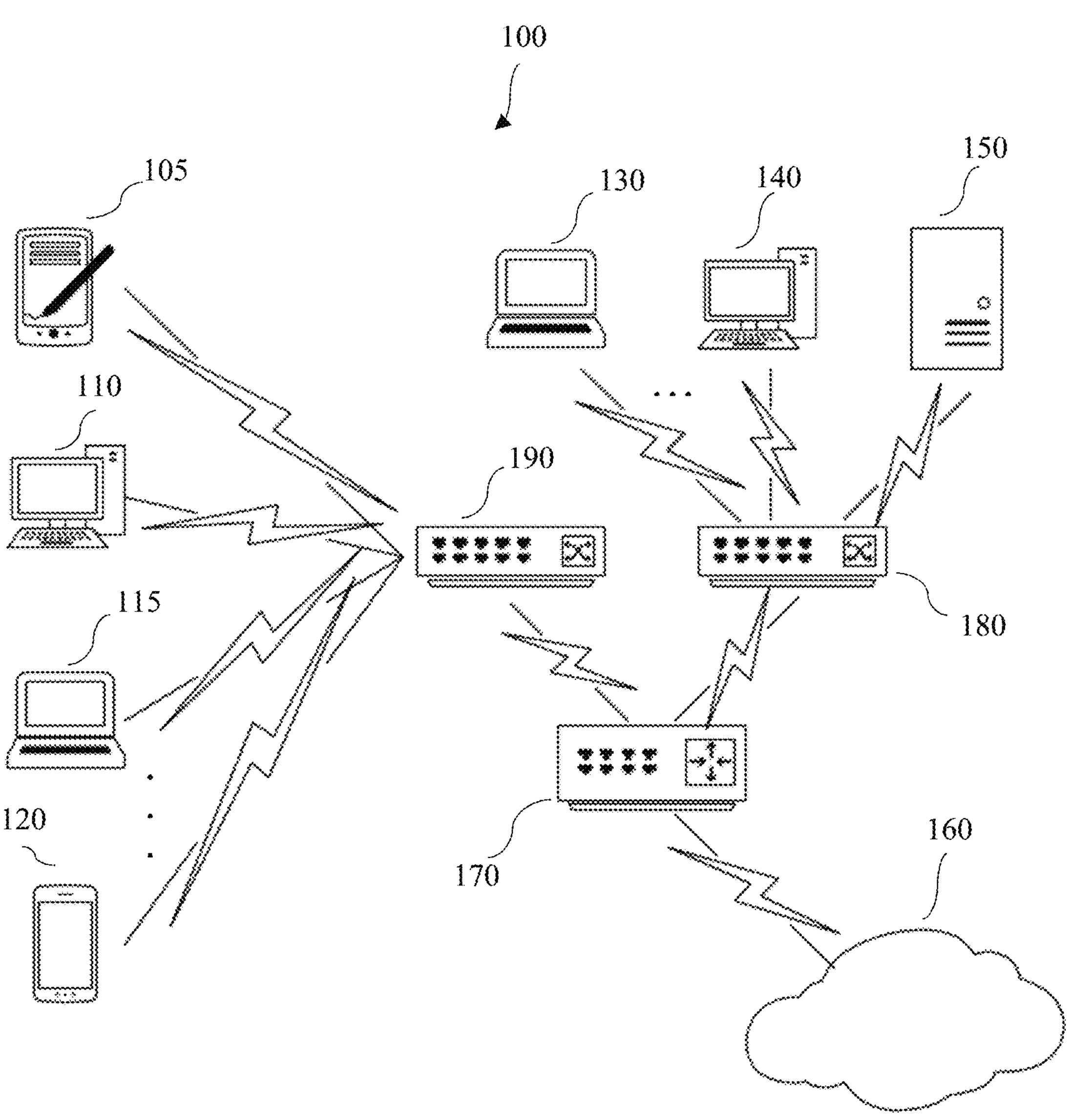
FIG. 1 is a schematic view of an example computer networking system for packet classification, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, "computer networking" or "computer network" is a term of art and may refer to interconnected computing devices that may exchange data and share resources with each other. It is to be understood that the networked devices may use a system of rules (e.g., communications protocols, etc.), to transmit information over wired or wireless technologies.

As referenced herein, a "packet", "data packet", "network packet", or "network data packet" in computer networking is a term of art and may refer to a formatted unit of data carried by a computer networking system. It is to be understood that a packet may include control information and user data. User data may refer to the "payload". Control information may provide information for delivering the payload (e.g., source and destination network addresses, error detection codes, sequencing information, etc.). It is also to be understood that control information typically may be stored in packet headers and/or trailers. It is further to be understood that control information may include metadata. Metadata in computer networking may refer to descriptive information about the user data, or "data about the data." Metadata may carry individual traits pertaining to the structure of communications protocols and the packets.

As referenced herein, a "header" of a packet may refer to an initial portion of the packet. It is to be understood that a header may contain control information such as addressing, routing, protocol version, etc. The format of the header information may depend on the communications protocol being used. For example, the Transmission Control Protocol/Internet Protocol (TCP/IP) model (the model used in the embodiments disclosed herein) may include a physical layer (L1), a data link layer (L2), an Internet layer (L3), a transport layer (L4), and an application layer (L5). In another example, in the Open Systems Interconnection (OSI) model from the International Organization for Standardization (ISO), the communications in a computer networking system may be split into different layers: a physical layer (L1), a data link layer (L2), a network layer (L3), a transport layer (L4), a session layer (L5), a presentation layer (L6), and an application layer (L7). Each layer may have its own communications protocol. For example, an L2 header may contain fields such as destination media access control (MAC) address, source MAC address, etc.

As referenced herein, "packet classification" in computer networking is a term of art and may refer to a process of identifying packets based on multiple fields of the packet headers and applying corresponding actions. It is to be understood that packet classification may provide a mechanism to differentiate data packets and enable differentiated functionalities such as access control list, quality of service, net flow, intrusion detection system or prevention intrusion system, firewall, and/or other network services.

As referenced herein, a "packet classifier" in computer networking may refer to a hardware block for packet classification. It is to be understood that the packet classifier may be a crucial component of many networking hardware devices in modern data centers, including but not limited to switches, routers, smart network interface card, security appliances, etc.

As referenced herein, a packet classification "rule" may refer to a set of information (including e.g., a combination of different header fields, etc.) to regulate the packet classification. It is to be understood that the packet classification rules may be predetermined (e.g., by a user, etc.). In the process of packet classification, a packet (e.g., an incoming packet, etc.) may be compared with each packet classification rule sequentially until a packet classification rule is found that matches all relevant fields of the packet. It is also to be understood that the packet classification rules may be arranged (e.g., in a match and action table including a ternary content-addressable memory and an action memory) in a priority order so that the best matching rule may be placed first in the table. Packet classification is to find the highest priority matching rules for every incoming packet. It is further to be understood that each packet classification rule may have an action associated with the rule, which may correspond to an operation to be performed on the incoming and matched packet. An action may include be accepting or dropping of packet (in the case of a firewall), forwarding the packet to a particular port (in the case of a router), providing differentiated service to the packet, and/or any other suitable action(s).

As referenced herein, a "traffic flow", "packet flow" or "network flow" in computer networking may refer to a sequence of packets from a source computer or device to a destination computer or device, which may be another host, a multicast group, or a broadcast domain. It is to be understood that a traffic flow may include all packets in a specific transport connection and/or a media stream, and may include a set of packets passing an observation point in the network during a certain time interval.

FIG. 1 is a schematic view of an example computer networking system 100 for packet classification, arranged in accordance with at least some embodiments described herein.

The system 100 may include devices 105, 110, 115, 120, 130, 140, 150, a network 160, a router 170, and/or network switches 180 and 190. It is to be understood that FIG. 1 only shows illustrative numbers of the devices (105, 110, 115, 120, 130, 140, 150, 170, 180, and/or 190) and/or the network. The embodiments described herein are not limited to the number of the devices and/or the network described. That is, the number of devices and/or networks described herein are provided for descriptive purposes only and are not intended to be limiting.

In accordance with at least some example embodiments, the devices 105, 110, 115, 120, 130, 140, and/or 150 may be various electronic devices. The various electronic devices may include but not be limited to a mobile device such as a smartphone, a tablet computer, an e-book reader, a laptop computer, a desktop computer, a server, and/or any other suitable electronic devices.

In accordance with at least some example embodiments, the network 160 may be a medium used to provide a communications link among the devices 105, 110, 115, 120, 130, 140, 150, 170, 180, and/or 190. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, one or more of the devices 105, 110, 115, 120, 130, 140, and/or 150 may be a server for providing various services to users using one or more of other devices. The server may be implemented by a distributed server cluster including multiple servers or may be implemented by a single server.

A user may use one or more of the devices 105, 110, 115, 120, 130, 140, 150, 170, 180, and/or 190 to interact with each other via the network 160. Various applications or localized interfaces thereof, such as social media applications, online shopping services, dataset operation services, machine learning services, or the like, may be installed on the devices 105, 110, 115, 120, 130, 140, and/or 150.

It is to be understood that software applications or services according to the embodiments described herein and/or according to the services provided by the service providers may be performed by the devices 105, 110, 115, 120, 130, 140, 150, 170, 180, and/or 190. Accordingly, the apparatus for the software applications and/or services may be arranged in the devices 105, 110, 115, 120, 130, 140, 150, 170, 180, and/or 190.

It is also to be understood that when a service is not performed remotely, the system 100 may not include the network 160, but include only the device 105, 110, 115, 120, 130, 140, 150, 170, 180, and/or 190.

It is further to be understood that the devices 105, 110, 115, 120, 130, 140, 150, 170, 180, and/or 190 may each include one or more processors, a memory, and a storage device storing one or more programs. The devices 105, 110, 115, 120, 130, 140, 150, 170, 180, and/or 190 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2A:
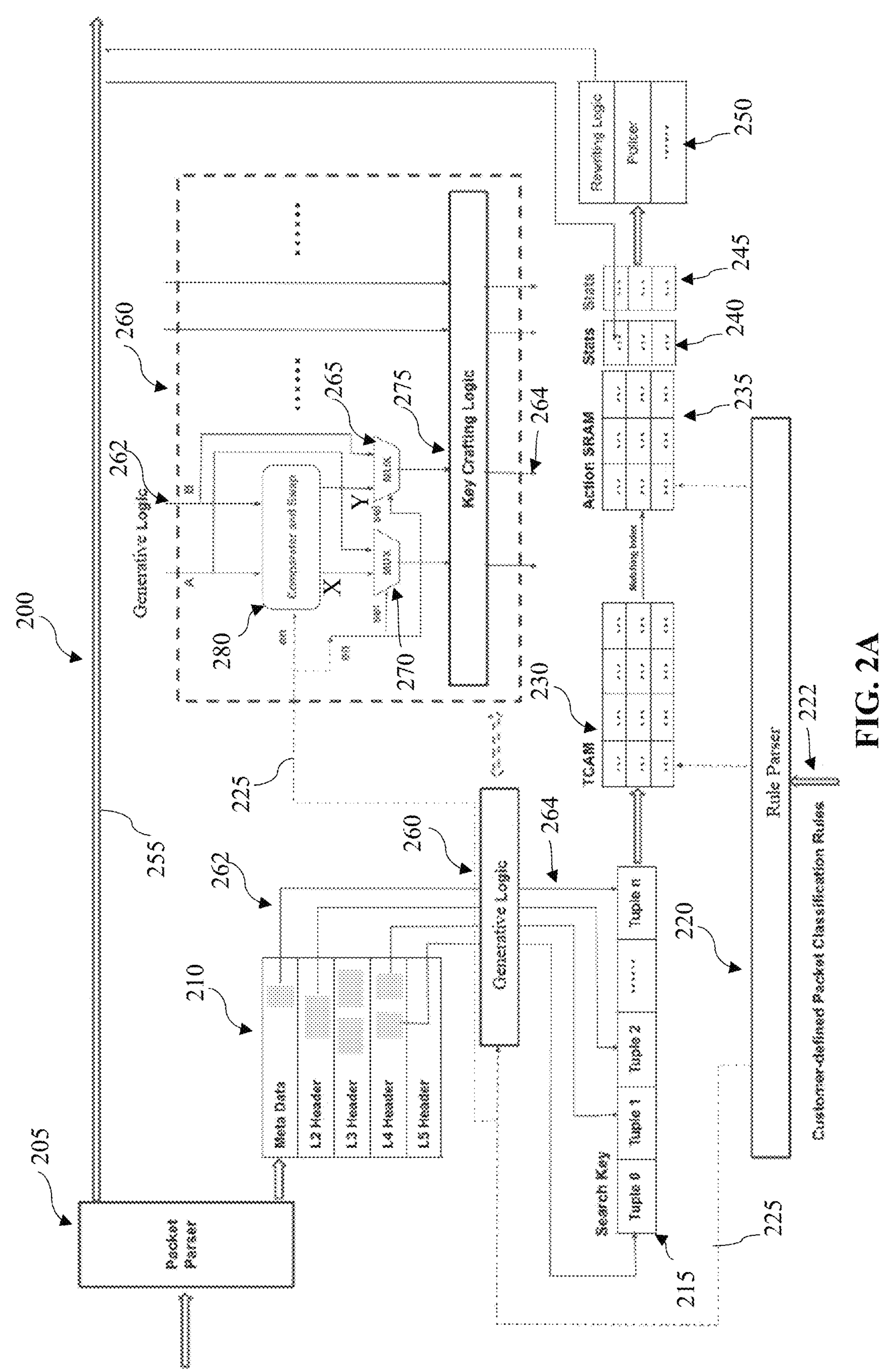
FIG. 2A is a schematic view of an example packet classifier for packet classification, arranged in accordance with at least some embodiments described herein.

FIG. 2A is a schematic view of an example packet classifier 200 for packet classification, arranged in accordance with at least some embodiments described herein. In an example embodiment, the packet classifier 200 may be a hardware component or hardware block of a switch (e.g., 180 and/or 190 of FIG. 1), a router (e.g., 170 of FIG. 1), a smart network interface card (not shown), a security appliance (not shown), etc.

In an example embodiment, the packet classifier 200 may include a packet parser 205, a buffer 210, a generative logic 260, a rule parser 220, a match and action table (230, 235, 240, and/or 245), and/or an action logic 250.

In an example embodiment, when or after the incoming data packet enters the packet classifier 200, the packet parser 205 may extract or parse various protocol headers (e.g., L2 header, L3 header, L4 header, and/or L5 header, etc.) and/or metadata of the packet and copy, save, and/or store the extracted or parsed headers and/or metadata in the buffer 210. The buffer 210 may be a temporary storage such as a section or portion of a memory, etc. The packet parser 205 may be a hardware component or block of the packet classifier 200.

In an example embodiment, the packet parser 205 may generate a state 255 for the packet based on the information associated with the packet. For example, the state 255 for the packet may include information such as the identification of the port (e.g., of the device such as the router, the switch, etc.) where the packet is received, the time when the packet arrives the port, the quality of service configuration of the packet, etc. It is to be understood that the state for the packet may exist for an entire lifetime of the packet in the device (e.g., the router, the switch, etc.), and may be passed to upcoming hardware blocks (e.g., the action logic 250, etc.) in the packet processing pipeline (to be described in detail below) of the packet classifier 200. It is to be understood that the state for the packet may include the intermediate data or metadata during the packet parsing process or processes in the packet classification pipeline, such as the ingress physical interface index, the ingress logical interface index, the virtual extensible local area network identifier (VNI), the packet length, etc.

It is to be understood that the packet parser 205 may be configured or reconfigured to recognize predetermined or customized protocols, e.g., where to extract a particular header in the packet, how many bytes of the header are to be extracted from the packet, etc.

It is also to be understood that the traffic flow (or packet flow) through the packet classifier 200 may be bidirectional, e.g., from a source device to a destination device via the packet classifier 200 and/or from the destination device to the source device via the packet classifier 200, etc. That is, at the packet level, most traffic flows are bidirectional and thus symmetric or substantially symmetric. It is further to be understood that in some embodiments, failure to maintain the inherent traffic flow symmetry may be an indicator of security risks.

In an example embodiment, the generative logic 260 may obtain, receive, or access the extracted or parsed headers and/or the metadata of the packet in the buffer 210 as input 262, and generate output 264 e.g., as a search key 215 for the packet. The generative logic 260 may be an extended key crafting logic that includes a key crafting logic 275 for generating e.g., search key(s) 215. To illustrate the structure of the generative logic 260, in FIG. 2A, an enlarged view (see the dotted box 260) of the generative logic 260 is shown. The generative logic 260 includes a comparator and swapper logic 280, at least a pair of multiplexers (265, 270), and the key crafting logic 275.

In an example embodiment, the rule parser 220 may be a hardware component or block of the packet classifier 200 configured to parse the predetermined or customized packet classification rules 222. In another example embodiment, the rule parser 220 may be implemented via e.g., an algorithm for parsing predetermined or customized packet classification rules. The classification rules may be inputted to the rule parser 220 via e.g., a command line interface of the device (e.g., the router, the switch, etc.), commands from Software-Defined Networking (SDN) controller(s), or any other suitable input mechanism(s).

It is to be understood that SDN, a network deployment paradigm, may decouple the control plane (e.g., the networking logic, etc.) from the data plane (the forwarding logic, etc.) for network packets. SDN may support network packets in proprietary protocols specified by customers of protocols with programmable data plane devices whose packet parsing and forwarding policies can be defined in a human-readable high-level domain specific language such as programming protocol-independent packet processors.

It is also to be understood that SDN may use hardware models such as programming protocol-independent packet processors and match and action table(s) (e.g., a match-action flow table(s), which are essentially the abstraction of packet classifications in various forms). It is to be understood that a match and action table may include one or more match fields (e.g., in a ternary content-addressable memory (TCAM), etc.) and one or more action (and/or statistics) fields (in a static random-access memory (SRAM), etc.). At run time, a match and action table (230, 235, 240, and/or 245) may include entries generated with a same set of match fields and action fields. Match fields (230) may define how bits in the extracted headers and metadata from the packet are used for packet classification to identify a traffic flow. Action fields (235, 240, and/or 245) may specify the operations (235) such as forwarding decision, packet rewriting rules, etc. and statistics (240, 245).

In an example embodiment, the match fields (230) may be a pattern that encodes a predicate on packet headers and may be implemented by using e.g., a ternary content-addressable memory (TCAM). The action fields including the actions (235) and/or the statistics (240, 245) may be implemented by using e.g., a static random-access memory (SRAM).

In an example embodiment, a packet classification protocol may be predetermined and used by the components (e.g., 260, 220, etc.) of the packet classifier 200. The packet classification protocol may include information such as matching criteria, etc. For example (the first embodiment), a user command with the matching criteria (e.g., to program a match-action flow table with an identification number 0) may include an eight tuple key (match-tuples) to classify a packet into a certain traffic flow: flow table 0 match-tuples eth_type dmac smac dst_ip src_ip ip_proto dst_port src_port, where the matching criteria (e.g., a packet classification key) may include the following eight fields: the Ethernet type (eth_type) in the L2 header, a destination MAC address (dmac) in the L2 header, a source MAC address (smac) in the L2 header, a destination IP address (e.g., IPv4, etc., dst_ip) in the L3 header, a source IP address (e.g., IPv4, etc., src_ip) in the L3 header, the L4 protocol (ip_proto) in the L3 header, a TCP/UDP destination port (dst_port) in the L4 header, and a TCP/UDP source port (src_port) in the L4 header. It is to be understood that the user command e.g., with the matching criteria may be inputted to the device (e.g., the router, the switch, etc.) via a command line interface of the device, via commands from the SDN controller(s), or via any other suitable input mechanism(s), and may be e.g., parsed by the rule parser 220. It is to be understood that the packet classification protocol (including the matching criteria) is provided for descriptive purposes only and is not intended to be limiting.

In the first embodiment, based on the matching criteria, the generative logic 260 may obtain, receive, or access the above fields in the extracted or parsed headers and/or the metadata of the packet in the buffer 210 as input 262, and generate output 264 e.g., as a search key 215 for the packet, where the search key 215 may include tuples (from identification number 0 to N) corresponding to the above eight tuple key (e.g., tuple 0 corresponds to the Ethernet type of the packet, tuple 1 corresponds to the destination MAC address of the packet, . . . , tuple 7 corresponds to the source port of the packet, etc.), with value or data from the packet. It is to be understood that in the first embodiment, the generative logic 260 may be the key crafting logic 275 (without the components 265, 270, and 280).

In the first embodiment, based on the matching criteria, user command(s) with predetermined packet classification rules may include the following: (1) flow add-entry 1 table=0, eth_type=0x0800, dmac=2c:9d:1e:6c:5a:12, smac=2c:9d:1e:6c:54:2e, dst_ip=10.16.69.216/32, src_ip=10.16.69.211/32, ip_proto=0x6, dst_port=8080, src_port=11688, action=send-to-host, and (2) flow add-entry 2 table=0, eth_type=0x0800, dmac=2c:9d:1e:6c:54:2e, smac=2c:9d:1e:6c:5a:12, dst_ip=10.16.69.211/32, src_ip=10.16.69.216/32, ip_proto=0x6, dst_port=11688, src_port=8080, action=send-to-host. The rule parser 220 may parse the above two user command(s) with the predetermined packet classification rules, and/or to program the match and action table (230, 235, 240, and/or 245) to add the entries in the match and action table (e.g., to add the two entries with the eight tuple key to match fields 230, to add the actions (e.g., send-to-host) to each of the corresponding action fields 235, etc.).

In the first embodiment, the match fields 230 may include the eight fields: eth_type, dmac, smac, dst_ip, src_ip, ip_proto, dst_port, and src_port. A first entry "0x0800, 2c:9d:1e:6c:5a:12, 2c:9d:1e:6c:54:2e, 10.16.69.216, 10.16.69.211, 0x6, 8080, 11688" and a second entry "0x0800, 2c:9d:1e:6c:54:2e, 2c:9d:1e:6c:5a:12, 10.16.69.211, 10.16.69.216, 0x6, 11688, 8080" are programmed to the match and action table (230, 235, 240, and/or 245) corresponding to the match fields 230 (TCAM). Similarly, a first entry "send-to-host" or the like and a second entry "send-to-host" or the like are programmed to the match and action table (230, 235, 240, and/or 245) corresponding to the action fields (235). It is to be understood that the entries of the match fields 230 (TCAM) are for symmetrical traffic flows, and thus there might be data redundancy between the two traffic flow entries in the TCAM. It is to be understood that in the first embodiment, the statistics field 245 may be optional. When the statistics field 240 is updated to store the statistics of the packets, the first entry "7" packets or the like and a second entry "4" packets or the like are programmed to the match and action table (230, 235, 240, and/or 245) corresponding to the statistics field (240).

In an example embodiment, to account for the data redundancy due to the symmetrical traffic flows, a commutable matching tuple may be applied. The commutable matching tuple may be a commutable matching tuple pair or a commutable matching tuple group. It is to be understood that the commutable matching tuple(s) may be extended to more than commutable matching tuple pair(s) (e.g., commutable matching tuple group(s) where each group includes two or more elements). To define a commutable matching tuple pair, assuming that a n-tuple (e.g., eight tuple in the above embodiment, etc.) packet classification rule R with an array of m entries uses an ordered tuples T[0], T[1], . . . , and T[n−1] to frame the searching key; assuming that M[i] and A[i] are the respective matching rule and the action of the i-th match-action flow table entry R[i]; and assuming that R[i][j] is the j-th tuple value of the i-th entry which is programmed in the TCAM entry for R[i]; the tuples T[s] and T[t] are defined to be a commutable matching tuple pair if A[x]==A[z] are true for all R[x][s]==R[z][t] and R[x][t]==R[z][s], where $0 \leq x \leq m-1$, $0 \leq z \leq m-1$, $0 \leq s \leq n-1$, and $0 \leq t \leq n-1$. If T[s] and T[t] (e.g., dmac and smac, dst_ip and src_ip, or dst_port and src_port) are commutable matching tuple pairs, the match-action flow table including the match fields 230 (TCAM) may be made more compact. In a simplified example embodiment, the pair of tuples T[s] and T[t] are commutable matching tuple pairs if, after the T[s] and T[t] are exchanged (e.g., in position, by value, etc.), the actions in the corresponding packet classification rules (before and after T[s] and T[t] being exchanged) are the same.

In an example embodiment (the second embodiment), with the commutable matching tuple (e.g., the commutable matching tuple pair), the user command with the matching criteria that include the eight tuple key (match-tuples) to classify the packet into a certain traffic flow in the first embodiment may be revised to be: flow table 0 match-tuples eth_type {dmac smac} {dst_ip src_ip} ip_proto {dst_port src_port} where the matching criteria (e.g., a packet classification key) may include the following eight fields: the Ethernet type (eth_type) in the L2 header, a destination MAC address (dmac) in the L2 header, a source MAC address (smac) in the L2 header, a destination IP address (e.g., IPv4, etc., dst_ip) in the L3 header, a source IP address (e.g., IPv4, etc., src_ip) in the L3 header, the L4 protocol (ip_proto) in the L3 header, a TCP/UDP destination port (dst_port) in the L4 header, and a TCP/UDP source port (src_port) in the L4 header. It is to be understood that the close curly brackets (or similar symbols) may be added to mark the commutable matching tuple pairs (the sequence or order of the pair matters, assuming the values of the pair are in an ascendant sequence/order or an descendant sequence/order), which are dmac and smac, dst_ip and src_ip, and dst_port and src_port. It is also to be understood that unless otherwise specified, the first embodiment and the second embodiment may have a same process, configuration, arrangement, and/or structure.

In the second embodiment, the match fields 230 may include the eight fields: eth_type, dmac, smac, dst_ip, src_ip, ip_proto, dst_port, and src_port. With the use of the commutable matching tuple (e.g., the commutable matching tuple pair), since the commutable matching tuple pairs dmac and smac, dst_ip and src_ip, and dst_port and src_port are in a predefined sequence or order (e.g., an ascendant order), the two packet classification rules (1) flow add-entry 1 table=0, eth_type=0x0800, dmac=2c:9d:1e:6c:5a:12, smac=2c:9d:1e:6c:54:2e, dst_ip=10.16.69.216/32, src_ip=10.16.69.211/32, ip_proto=0x6, dst_port=8080, src_port=11688, action=send-to-host, and (2) flow add-entry 2 table=0, eth_type=0x0800, dmac=2c:9d:1e:6c:54:2e, smac=2c:9d:1e:6c:5a:12, dst_ip=10.16.69.211/32, src_ip=10.16.69.216/32, ip_proto=0x6, dst_port=11688, src_port=8080, action=send-to-host in the first embodiment may be combined to one packet classification rule: flow add-entry 1 table=0, eth_type=0x0800, dmac=2c:9d:1e:6c:54:2e, smac=2c:9d:1e:6c:5a:12, dst_ip=10.16.69.211/32, src_ip=10.16.69.216/32, ip_proto=0x6, dst_port=11688, src_port=8080, action=send-to-host.

Similarly, in the second embodiment, with the use of the commutable matching tuple (e.g., the commutable matching tuple pair), the two entries "0x0800, 2c:9d:1e:6c:5a:12, 2c:9d:1e:6c:54:2e, 10.16.69.216, 10.16.69.211, 0x6, 8080, 11688" and "0x0800, 2c:9d:1e:6c:54:2e, 2c:9d:1e:6c:5a:12, 10.16.69.211, 10.16.69.216, 0x6, 11688, 8080" in the first embodiment may be combined to be one entry in a predefined sequence or order "0x0800, 2c:9d:1e:6c:54:2e, 2c:9d:1e:6c:5a:12, 10.16.69.211, 10.16.69.216, 0x6, 11688, 8080", and the combined entry may be programmed to the match and action table (230, 235, 240, and/or 245) corresponding to the match fields 230 (TCAM). Similarly, a combined entry for the same action (that corresponds to the combined match fields entry) "send-to-host" or "forward-to-host" or the like may be programmed to the match and action table (230, 235, 240, and/or 245) corresponding to the action fields (235). It is to be understood that in the second embodiment, the generative logic 260 includes the key crafting logic 275 and the components 265, 270, and 280. In an example embodiment, the comparator and swapper logic 280 and/or the at least a pair of multiplexers (265, 270) may be used to preprocess the predetermined or customized rules containing the commutable matching tuple (e.g., the commutable matching tuple pair) e.g., to sort the commutable matching tuple (e.g., the commutable matching tuple pair) in an ascendant or descendant order.

Referring back to FIG. 2A, with the use of the commutable matching tuple (e.g., the commutable matching tuple pair, etc.), the rule parser 220 may parse the predetermined or customized packet classification rules (such as e.g., inputs or commands of packet classification protocol including matching criteria, inputs or commands of packet classification rules for programming the match fields TCAM 230 and/or the action fields SRAM 235) e.g., to identify or determine the commutable matching tuple pairs.

Based on the predetermined or customized packet classification rules, the rule parser 220 may configure or actuate the generative logic 260 such that the output 264 (i.e., the generated corresponding search key 215) of the generative logic 260 may have a same format as the entry or entries of the match fields (TCAM) 230 of the match and action table. The rule parser 220 may also program or write the match fields (TCAM) 230 and the action fields (SRAM) 235 based on the predetermined or customized packet classification rules, with the use of the commutable matching tuple (e.g., the commutable matching tuple pair, etc.) to remove data redundancies intrinsic to the commutable tuple pairs in the expensive traffic flow tables (including the match fields (TCAM) 230). It is to be understood that the features in the embodiments disclosed herein may aggregate traffic flow table entries (including entries of the match fields (TCAM) 230) with commutable matching tuple pairs by consistently framing search key 215 by the generative logic 260 and programing the combined TCAM entry e.g., by the rule parser 220 regardless of the orders or sequences of the commutable matching tuple pairs.

In an example embodiment, the generative logic 260 includes a comparator and swapper (CAS) circuits or hardware block or logic 280 or the like as preprocessing for bytes of commutable matching tuples. As shown in FIG. 2, the CAS logic 280 may include at least two n-bit data inputs 262 including A (A[n−1] . . . A[1]A[0]) and B (B[n−1] . . . B[1]B[0]) to e.g., represent the tuple pair, an actuator 225 or control signal "en" (which may be "enabled" or "actuated" if en==1, or "disabled" or "not actuated" if en==0) e.g., from the rule parser 220, and two n-bit data outputs including X (X[n−1] . . . X[1]X[0] and Y (Y[n−1] . . . Y[1]Y[0]) to e.g., represent the sorted tuple pair. In an example embodiment, the tuple pair bytes are sorted or arranged in an ascendant order. In an example embodiment, the tuple pair bytes are sorted or arranged in a descendant order.

In an example embodiment, the functionality of the CAS logic 280 may include (1) if the control signal en 225 is 0, the CAS logic 280 may be in a pass-through or bypass mode, i.e., X=A and Y=B; (2) if the control signal en 225 is 1, inputs A and B may be sorted by the CAS logic 280 and then written into outputs X and Y (e.g., for an ascendant order, the smaller one goes to X, while the larger one goes to Y). It is to be understood that based on testing and analysis, the total transistor count complexity of the hardware-based CAS logic 280 may be on the order of O(N), where N is the number of bits of the input A (and/or B), the number of the inputs A (and/or B), etc.

It is to be understood that once the rule parser 220 identifies at least one commutable matching tuple (e.g., the commutable matching tuple pair, etc., by recognizing the curly brackets or the like) e.g., by parsing the predetermined or customized packet classification rules, the rule parser 220 may extract the designated or identified commutable matching tuple pairs, and instruct the hardware packet classifier 200 to configure or actuate the generative hardware logic 260, e.g., by setting the control signal en 225 to 1. If no commutable matching tuple (e.g., the commutable matching tuple pair, etc.) is identified, the rule parser 220 may set the control signal en 225 to 0.

It is also to be understood that the actuator or control signal "en" 225 may also be configured as the select signal for the pair of multiplexers (265, 270). In an example embodiment, if the control signal en 225 is 1, inputs A and B may be sorted by the CAS logic 280 and then written into outputs X and Y, and then outputs X and Y may be selected as input to the key crafting logic 275. If the control signal en 225 is 0, inputs A and B (that bypass the CAS logic 280) may be selected as input to the key crafting logic 275.

In an example embodiment, after the rule parser 220 configures the generative logic 260 and/or programs the match and action table including match fields TCAM 230 and/or the action fields SRAM 235, the packet parser 205 may parse or extract headers and/or metadata of the packet; copy, save, or store the parsed or extracted headers and/or metadata in the buffer 210; and generate the state 255 for the packet. The key crafting logic 275 may fetch, obtain or receive the required bits from the buffer 210 based on the predetermined packet classification rules to generate a search key 215 that has consistent width and format with those of the match fields 230 (TCAM).

It is to be understood that the match fields TCAM 230 may be used for wildcard and/or exact matches. In an example embodiment, immediately after the predetermined or customized packet classification rules are activated (e.g., by the rule parser 220, via e.g., configuring the generative logic 260) and before the incoming traffic flow is ready to be accepted (e.g., by the packet parser 205), the components of each valid TCAM entry, such as the Value, Mask, and/or Result, may be programmed with the information provided by the predetermined or customized packet classification rules. The term VMR (Value, Mask and Result) may refer to the format of entries in TCAM. The "value" in VMR may refer to the pattern that is to be matched; examples include IP addresses, protocol ports, Differentiated Services Code Point (DSCP) values, etc. The "mask" may refer to the mask bits associated with the pattern and determine the prefix. The "result" may refer to the action that may occur in the case where a lookup of the TCAM returns a hit for the pattern and mask.

In an example embodiment, when the search key 215 (framed based on the current packet in the pipeline) is generated, the search key 215 may be fed into the TCAM 230 to perform or conduct a matching between the search key 215 and the programed entries of the TCAM 230. If there is a match (between the search key 215 and the programed entries of the TCAM 230), an index of the matched entry (with the highest priority if there are multiple matches) of the TCAM 230 may be returned. If there is no match, a default catch-all entry of the TCAM 230 may be returned. The returned index may then be used to look up the associated action SRAM 235 for the corresponding actions (such as the final packet classification results, including rewriting logic, police, etc.).

In an example embodiment, actions in the action fields (SRAM) 235 may include a "permit" or "deny", values for quality of service policies, a pointer to an entry in the hardware adjacency table (e.g., the action logic 250) that contains e.g., the next-hop MAC rewrite information. That is, the action algorithms in the action logic 250 may be performed or conducted based on the actions in the SRAM 235 that correspond to the returned index.

In an example embodiment, when the matching between the search key 215 and the programed entries of the TCAM 230 is conducted, the statistics fields (240, 245) may be updated e.g., based on the info in the state 255 of the packet. It is to be understood that each of the statistics fields (240, 245) may include statistics of the packet such as a set of counters that keep track of the total number and total size of packets processed using the entry. The statistics fields (240, 245) may be implemented using e.g., SRAM. The statistics field 240 may be used to store the statistics (e.g., "4" packets, etc. for the first direction) of the packet for a first direction, and the statistics field 245 may be used to store the statistics (e.g., "7" packets, etc. for the second direction) of the packet for a second direction that is the reversed direction of the first direction (for symmetric traffic flows). In an example embodiment, the state 255 of the packet may be updated based on the action results (e.g., from the action logic 250), before the state 255 flows further in the pipeline.

It is to be understood that the match fields (TCAM) 230 and the action fields (SRAM) 235 may be programmed (or pre-programmed) based on the predetermined or customized packet classification rules, and that the statistics fields (SRAM) (240, 245) may be dynamically updated by hardware logic or block based on the matching (e.g., between the traffic flow and the entries in the match and action table). Each entry of the statistics fields (SRAM) (240, 245) may be updated to store the statistics of the traffic flow or packet flow such as the packet number (number of good or matched packets received), byte counter (number of good or matched bytes received), etc., for the corresponding traffic flow direction.

It is also to be understood that when the key crafting logic 275 fetch, obtain or receive the required bits from the buffer 210 based on the predetermined packet classification rules to generate a search key 215 that has consistent width and format with those of the match fields 230 (TCAM), the comparator and swapper logic 280 and the at least a pair of multiplexers (265, 270) may sort the commutable matching tuple (e.g., the commutable matching tuple pair, etc.) in the inputs 262 (in an ascendant or descendent order) based on the predetermined or customized packet classification rules that contain the commutable matching tuple (e.g., the commutable matching tuple pair, etc.).

Figure 2B:
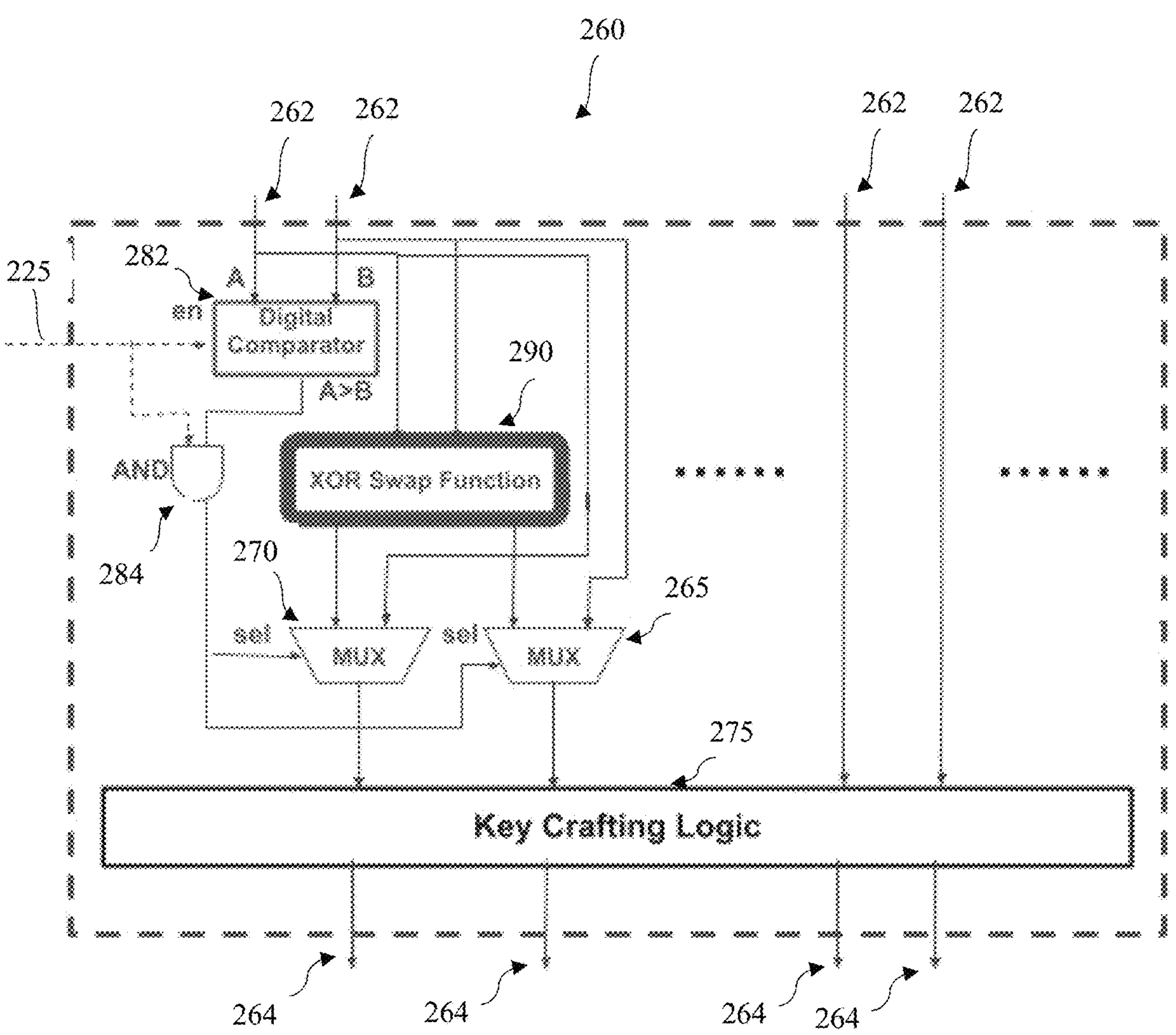
FIG. 2B is a schematic view of an example generative logic of FIG. 2A, arranged in accordance with at least some embodiments described herein.

FIG. 2B is a schematic view of an example generative logic 260 of FIG. 2A, arranged in accordance with at least some embodiments described herein. It is to be understood that unless specified otherwise, the generative logic 260 may have a same process, configuration, arrangement, and/or structure of the generative logic 260 of FIG. 2A.

As shown in FIG. 2B, the comparator and swapper logic (see 280 of FIG. 2A) may include a comparator 282, an "AND" logic gate 284, and a swap logic 290. In an example embodiment, the comparator 282 may be a digital comparator (e.g., that outputs 1 when A is greater than B). When the actuator 225 is set to 0, the output of the logic gate 284 is 0, and the inputs 262 including A and B may be selected to pass-through the multiplexers 265 and 270 (as an input to the key crafting logic 275). When the actuator 225 is set to 1, and A is greater than B, the output of the logic gate 284 is 1, the inputs 262 including A and B may be swapped via the swap logic 290, and the swapped results from the swap logic 290 may be selected to pass-through the multiplexers 265 and 270. When the actuator 225 is set to 1, and A is not greater than B, the output of the logic gate 284 is 0, and the inputs 262 including A and B may be selected to pass-through the multiplexers 265 and 270.

It is to be understood that statistics (240, 245) with finer granularity may be available if the traffic flow tables entries are aggregated with commutable matching tuple pairs, in which scenarios the statistics may be updated based on e.g., the intermediate A>B signal outputted by the digital comparator 282.

Figure 2C:
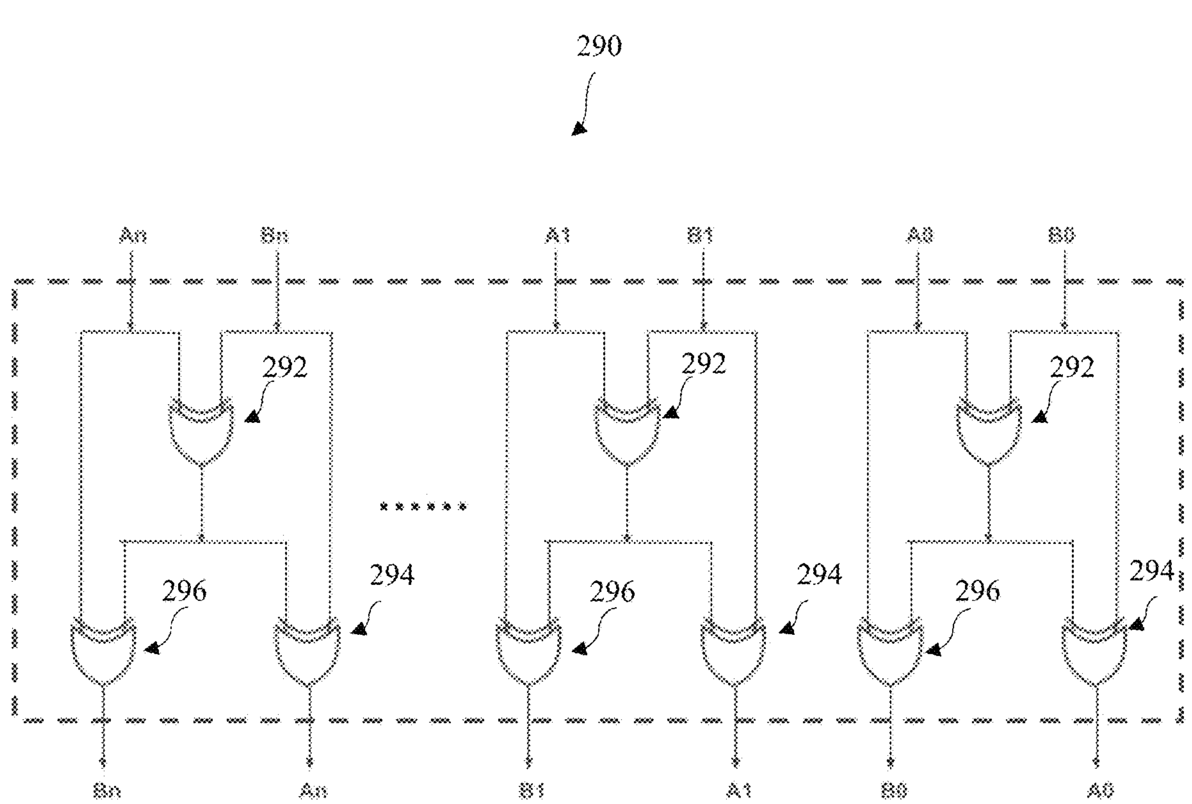
FIG. 2C is a schematic view of an example swap logic of FIG. 2B, arranged in accordance with at least some embodiments described herein.

FIG. 2C is a schematic view of an example swap logic 290 of FIG. 2B, arranged in accordance with at least some embodiments described herein. It is to be understood that unless specified otherwise, the swap logic 290 may have a same process, configuration, arrangement, and/or structure of the swap logic 290 of FIG. 2B.

In an example embodiment, the swap logic 290 may be an exclusive OR (XOR) swap logic. The swap logic 290 may include at least two n-bit data inputs including A (A[n−1] . . . A[1]A[0]) and B (B[n−1] . . . B[1]B[0]). The swap logic 290 may also include XOR logic gates 292, 294, and 296 for each bit A[i] and B[i], where 0<=i<=n. In an example embodiment, the swap logic 290 may implement the function that A and B are in an ascendant sequence or order. In another example embodiment, the swap logic 290 may implement the function that A and B are in a descendant sequence or order.

Figure 3:
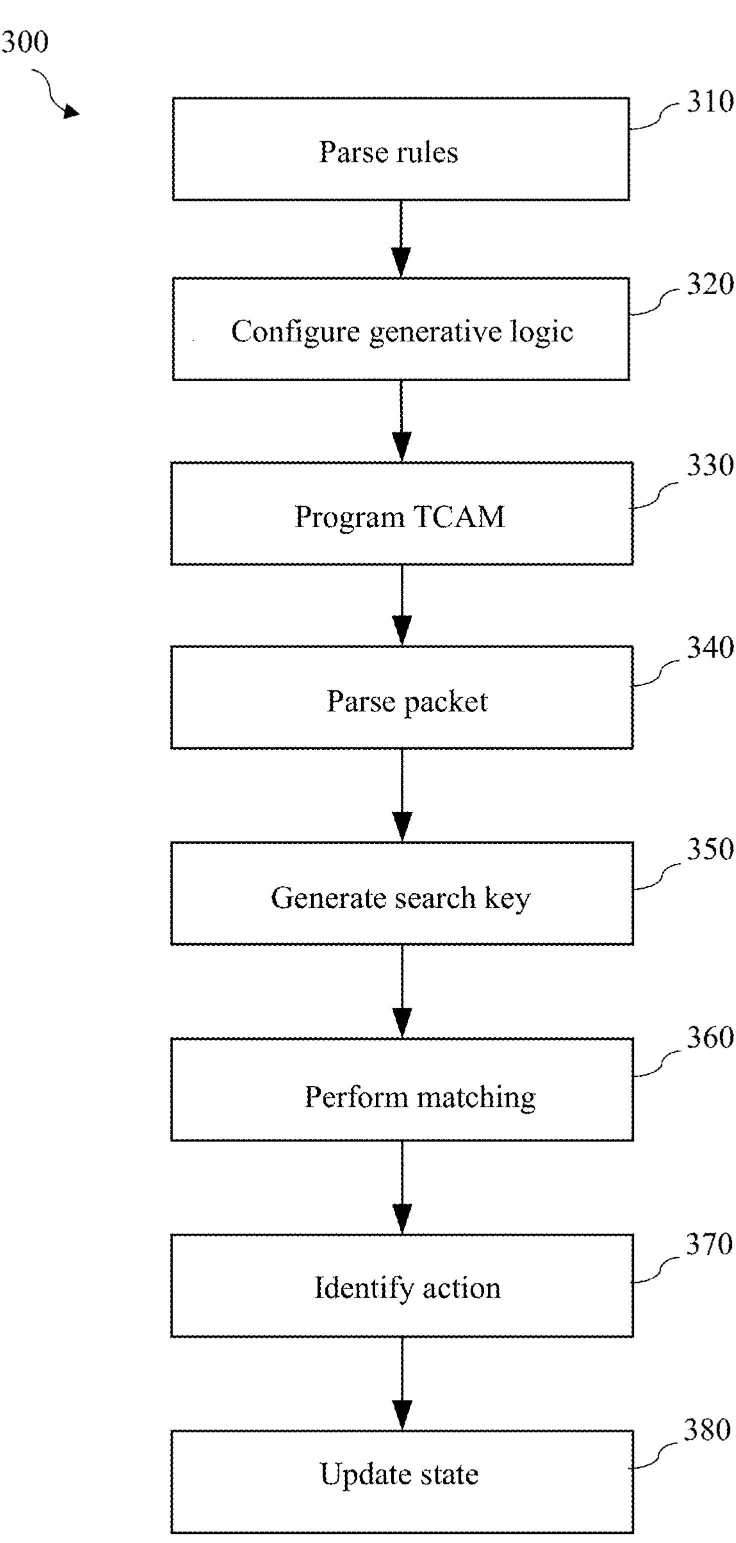
FIG. 3 is a flow chart illustrating an example processing flow of programming a ternary content-addressable memory, in accordance with at least some embodiments described herein.

FIG. 3 is a flow chart illustrating an example processing flow 300 of programming a ternary content-addressable memory, in accordance with at least some embodiments described herein.

Figure 4:
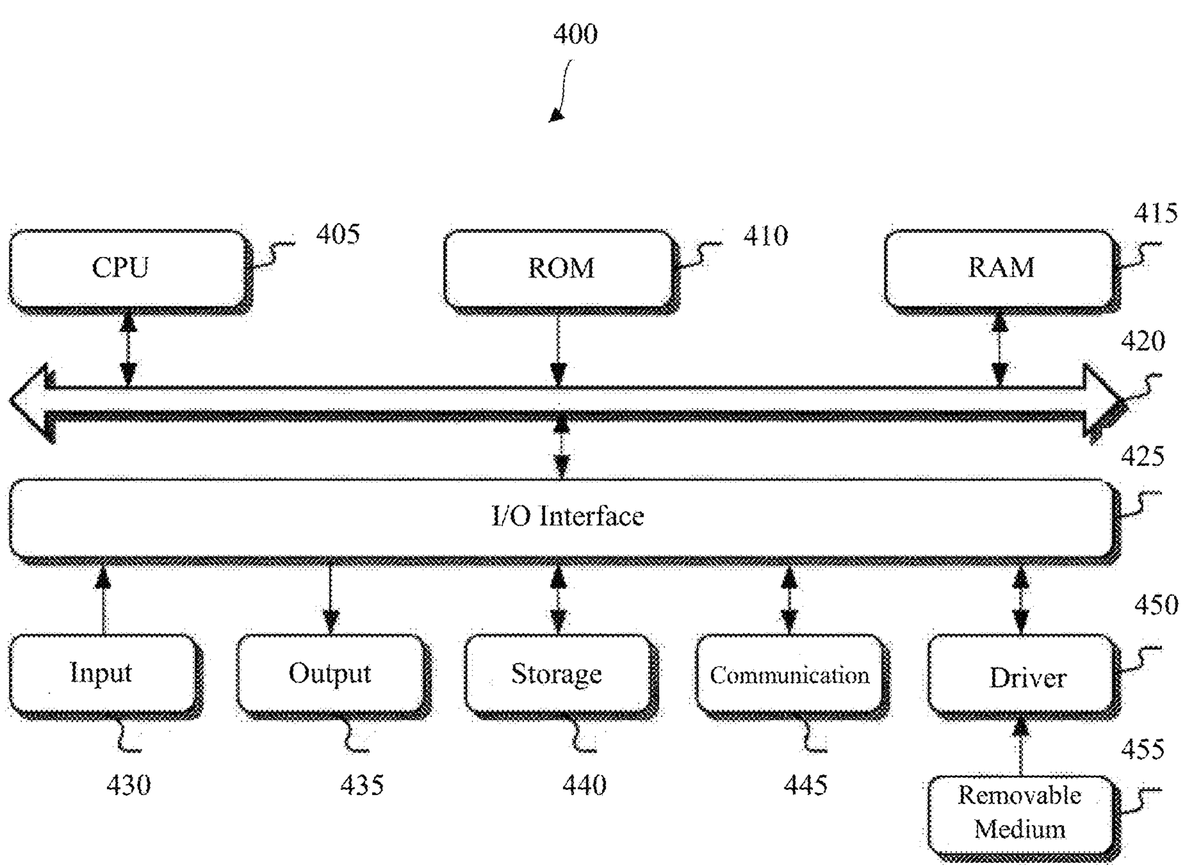
FIG. 4 is a schematic structural diagram of an example computer system applicable to implementing a device, arranged in accordance with at least some embodiments described herein.

It is to be understood that the processing flow 300 disclosed herein can be conducted by one or more processors such as a local device management CPU of the device (e.g., the router, the switch, etc.), including e.g., the processor of one or more of the device 105, 110, 115, 120, 130, 140, 150, 170, 180, and/or 190 of FIG. 1, the CPU 405 of FIG. 4, and/or any other suitable processor, unless otherwise specified.

It is also to be understood that the processing flow 300 can include one or more operations, actions, or functions as illustrated by one or more of blocks 310, 320, 330, 340, 350, 360, 370, and 380. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 300, operations including initializations or the like may be performed. For example, system parameters and/or application parameters may be initialized. It is to be understood that the processes, operations, or actions described in FIGS. 2A, 2B, and/or 2C may be implemented or performed by the processor. Processing flow 300 may begin at block 310.

At block 310 (Parse rules), the processor may parse or analyze a plurality of predetermined packet classification rules (including e.g., a packet classification protocol having matching criteria) that may contain the commutable matching tuple (e.g., the commutable matching tuple pair, etc.). The processor may also identify at least one commutable matching tuple (e.g., the commutable matching tuple pair, etc.) in the predetermined packet classification rules. Processing may proceed from block 310 to block 320.

At block 320 (Configure generative logic), the processor may configure and/or actuate the generative logic (e.g., an extended key crafting logic including a key crafting logic) based on the identified at least one commutable matching tuple (e.g., the commutable matching tuple pair, etc.). Processing may proceed from block 320 to block 330.

At block 330 (Program TCAM), the processor may program the TCAM based on the identified at least one commutable matching tuple (e.g., the commutable matching tuple pair, etc.) and/or the predetermined packet classification rules. The processor may also consolidate symmetric packet classification rules based on the identified commutable matching tuple (e.g., the commutable matching tuple pair, etc.). Processing may proceed from block 330 to block 340.

At block 340 (Parse packet), the processor may parse a packet to extract headers and metadata from the packet. The processor may also copy, save, or store the extracted headers and metadata in a buffer. The processor may further generate a state for the packet. Processing may proceed from block 340 to block 350.

At block 350 (Generate search key), the processor may generate a search key based on the extracted headers and metadata from the packet, based on the predetermined packet classification rules, and/or based on the identified commutable matching tuple (e.g., the commutable matching tuple pair, etc.). Processing may proceed from block 350 to block 360.

At block 360 (Perform matching), the processor may feed the generated search key into the TCAM. The processor may also perform a matching between the search key and the entries of the TCAM. Processing may proceed from block 360 to block 370.

At block 370 (Identify action), the processor may identify an action in an action memory based on an identified entry during the matching between the search key and the entries of the TCAM. The processor may also perform the identified action in the action logic. Processing may proceed from block 370 to block 380.

At block 380 (Update state), the processor may update the state for the packet based on the performed action. The processor may also update the statistics of the packet based on the state for the packet.

It is to be understood that features in the embodiments disclosed herein may reduce memory usage (e.g., the TCAM, the SRAM, etc.), reduce the power consumption of the device, increase and/or improve the TCAM utilization rate, and/or reduce the cost of the device.

FIG. 4 is a schematic structural diagram of an example computer system 400 applicable to implementing a device (for example, 105, 110, 115, 120, 130, 140, 150, 170, 180, and/or 190 of FIG. 1), arranged in accordance with at least some embodiments described herein. It is to be understood that the computer system shown in FIG. 4 is provided for illustration only instead of limiting the functions and applications of the embodiments described herein.

As depicted, the computer system 400 may include a central processing unit (CPU) 405. The CPU 405 may perform various operations and processing based on programs stored in a read-only memory (ROM) 410 or programs loaded from a storage device 440 to a random-access memory (RAM) 415. The RAM 415 may also store various data and programs required for operations of the system 400. The CPU 405, the ROM 410, and the RAM 415 may be connected to each other via a bus 420. An input/output (I/O) interface 425 may also be connected to the bus 420.

The components connected to the I/O interface 425 may further include an input device 430 including a keyboard, a mouse, a digital pen, a drawing pad, or the like; an output device 435 including a display such as a liquid crystal display (LCD), a speaker, or the like; a storage device 440 including a hard disk or the like; and a communication device 445 including a network interface card such as a LAN card, a modem, or the like. The communication device 445 may perform communication processing via a network such as the Internet, a WAN, a LAN, a LIN, a cloud, etc. In an embodiment, a driver 450 may also be connected to the I/O interface 425. A removable medium 455 such as a magnetic disk, an optical disk, a magneto-optical disk, a semiconductor memory, or the like may be mounted on the driver 450 as desired, such that a computer program read from the removable medium 455 may be installed in the storage device 440.

It is to be understood that the processes described with reference to the flowchart of FIG. 3 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 445, and/or may be installed from the removable medium 455. The computer program, when being executed by the central processing unit (CPU) 405, can implement the above functions specified in the method in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

ASPECTS

It is appreciated that any one of aspects can be combined with each other.

Aspect 1. A packet classifier for packet classification in computer networking, the packet classifier comprising: a packet parser; an extended key crafting logic; a match and action table; and a rule parser configured to parse predetermined rules and to identify at least one commutable matching tuple, wherein when the rule parser identifies the at least one commutable matching tuple in the predetermined rules, the rule parser actuates the extended key crafting logic and programs the match and action table based on the identified commutable matching tuple.

Aspect 2. The packet classifier of aspect 1, wherein the extended key crafting logic includes: at least a pair of inputs; a comparator and swapper; at least a pair of multiplexers; an actuator; and a key crafting logic, wherein when the commutable matching tuple is identified, the actuator is enabled, the comparator and swapper generates results based on the pair of inputs, and the key crafting logic receives the results that pass through the pair of multiplexers.

Aspect 3. The packet classifier of aspect 2, wherein when no commutable matching tuple is identified, the actuator is disabled, and the key crafting logic receives the pair of inputs that bypass the comparator and swapper and pass through the pair of multiplexers.

Aspect 4. The packet classifier of any one of aspects 1-3, wherein the match and action table includes: a ternary content-addressable memory (TCAM); and an action memory.

Aspect 5. The packet classifier of aspect 4, wherein when the commutable matching tuple is identified, the rule parser programs the TCAM by consolidating symmetric rules based on the commutable matching tuple.

Aspect 6. The packet classifier of aspect 5, wherein the symmetric rules correspond to a same action in the action memory of the match and action table.

Aspect 7. The packet classifier of aspect 5, wherein the action memory includes a first statistics field and a second statistics field, the first statistics field is configured to store statistics for a first packet flow, the second statistics field is configured to store statistics for a second packet flow that is in a reverse direction from the first packet flow.

Aspect 8. The packet classifier of any one of aspects 1-7, wherein the packet parser is configured to parse a packet to extract headers and metadata from the packet and to generate a state for the packet.

Aspect 9. The packet classifier of aspect 8, wherein the extended key crafting logic is configured to generate a search key based on the extracted headers and metadata from the packet.

Aspect 10. The packet classifier of aspect 9, wherein the packet classifier is configured to feed the search key into the match and action table to perform a matching between the search key and the match and action table.

Aspect 11. The packet classifier of aspect 10, wherein when an entry in a ternary content-addressable memory of the match and action table is identified during the matching between the search key and the match and action table, the packet classifier identifies an action in an action memory of the match and action table based on the identified entry.

Aspect 12. The packet classifier of aspect 11, wherein the packet classifier is configured to update the state for the packet based on the action.

Aspect 13. The packet classifier of aspect 11, wherein the action includes rewriting logic or police.

Aspect 14. The packet classifier of any one of aspects 10-13, wherein no entry in a ternary content-addressable memory (TCAM) of the match and action table is identified during the matching between the search key and the match and action table, the packet classifier identifies a default entry in the TCAM and identifies an action in an action memory of the match and action table based on the default entry.

Aspect 15. An extended key crafting logic comprising: at least a pair of inputs; a comparator and swapper; at least a pair of multiplexers; an actuator; and a key crafting logic, wherein when the actuator is enabled, the comparator and swapper generates results based on the pair of inputs, and the key crafting logic receives the results that pass through the pair of multiplexers.

Aspect 16. The extended key crafting logic of aspect 15, wherein when the actuator is disabled, the key crafting logic receives the pair of inputs that bypass the comparator and swapper and pass through the pair of multiplexers.

Aspect 17. The extended key crafting logic of aspect 15 or aspect 16, wherein the comparator and swapper includes a digital comparator and an exclusive OR (XOR) swap logic.

Aspect 18. The extended key crafting logic of aspect 17, wherein the pair of multiplexers is controlled by the actuator and by an output of the digital comparator.

Aspect 19. The extended key crafting logic of aspect 17 or aspect 18, wherein the XOR swap logic is configured to sort values of the pair of inputs in an ascendant order.

Aspect 20. The extended key crafting logic of aspect 17 or aspect 18, wherein the XOR swap logic is configured to sort values of the pair of inputs in a descendant order.

Aspect 21. A method for programming a ternary content-addressable memory (TCAM), the method comprising: paring a plurality of predetermined rules; identifying at least one commutable matching tuple in the predetermined rules; actuating an extended key crafting logic based on the identified at least one commutable matching tuple; and programming the TCAM based on the identified commutable matching tuple.

Aspect 22. The method of aspect 21, wherein the programming of the TCAM includes: consolidating symmetric rules based on the identified commutable matching tuple.

Aspect 23. The method of aspect 21 or aspect 22, further comprising: parsing a packet to extract headers and metadata from the packet; and generating a state for the packet.

Aspect 24. The method of aspect 23, further comprising: generating a search key based on the extracted headers and metadata from the packet.

Aspect 25. The method of aspect 24, further comprising: feeding the search key into the TCAM; and performing a matching between the search key and the TCAM.

Aspect 26. The method of aspect 25, further comprising: identifying an action in an action memory based on an identified entry during the matching between the search key and the TCAM; and updating the state for the packet based on the action.

Aspect 27. A non-transitory computer-readable medium having computer-executable instructions stored thereon that, upon execution, cause one or more processors to perform operations comprising: paring a plurality of predetermined rules; identifying at least one commutable matching tuple in the predetermined rules; actuating an extended key crafting logic based on the identified at least one commutable matching tuple; and programming a ternary content-addressable memory (TCAM) based on the identified commutable matching tuple.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A packet classifier for packet classification in computer networking, the packet classifier comprising:

a packet parser;

an extended key crafting logic;

a match and action table comprising a ternary content-addressable memory (TCAM); and a rule parser configured to parse predetermined rules and to identify at least one commutable matching tuple, wherein when the rule parser identifies the at least one commutable matching tuple in the predetermined rules, the rule parser actuates the extended key crafting logic and programs the match and action table based on the identified commutable matching tuple and programs the TCAM by consolidating symmetric rules based on the commutable matching tuple.

2. The packet classifier of claim 1, wherein the extended key crafting logic includes:

at least a pair of inputs;

a comparator and swapper;

at least a pair of multiplexers;

an actuator; and a key crafting logic, wherein when the commutable matching tuple is identified, the actuator is enabled, the comparator and swapper generates results based on the pair of inputs, and the key crafting logic receives the results that pass through the pair of multiplexers.

3. The packet classifier of claim 2, wherein when no commutable matching tuple is identified, the actuator is disabled, and the key crafting logic receives the pair of inputs that bypass the comparator and swapper and pass through the pair of multiplexers.

4. The packet classifier of claim 1, wherein the match and action table includes:

an action memory.

5. The packet classifier of claim 1, wherein the symmetric rules correspond to a same action in an action memory of the match and action table.

6. The packet classifier of claim 1, wherein an action memory includes a first statistics field and a second statistics field, the first statistics field is configured to store statistics for a first packet flow, the second statistics field is configured to store statistics for a second packet flow that is in a reverse direction from the first packet flow.

7. The packet classifier of claim 1, wherein the packet parser is configured to parse a packet to extract headers and metadata from the packet and to generate a state for the packet.

8. The packet classifier of claim 7, wherein the extended key crafting logic is configured to generate a search key based on the extracted headers and metadata from the packet.

9. The packet classifier of claim 8, wherein the packet classifier is configured to feed the search key into the match and action table to perform a matching between the search key and the match and action table.

10. The packet classifier of claim 9, wherein when an entry in a ternary content-addressable memory of the match and action table is identified during the matching between the search key and the match and action table, the packet classifier identifies an action in an action memory of the match and action table based on the identified entry.

11. The packet classifier of claim 10, wherein the packet classifier is configured to update the state for the packet based on the action.

12. The packet classifier of claim 10, wherein the action includes rewriting logic or police.

13. The packet classifier of claim 9, wherein no entry in a ternary content-addressable memory (TCAM) of the match and action table is identified during the matching between the search key and the match and action table, the packet classifier identifies a default entry in the TCAM and identifies an action in an action memory of the match and action table based on the default entry.

14. An extended key crafting logic comprising:

at least a pair of inputs;

a comparator and swapper comprising a digital comparator and an exclusive OR (XOR) swap logic;

at least a pair of multiplexers;

an actuator; and a key crafting logic, wherein the pair of multiplexers is controlled by the actuator and by an output of the digital comparator, wherein the XOR swap logic is configured to sort values of the pair of inputs, wherein when the actuator is disabled, the key crafting logic receives the pair of inputs that bypass the comparator and swapper and pass through the pair of multiplexers, and when the actuator is enabled, the comparator and swapper generates results based on the pair of inputs, and the key crafting logic receives the results that pass through the pair of multiplexers.

15. The extended key crafting logic of claim 14, wherein when the actuator is disabled, the key crafting logic receives the pair of inputs that bypass the comparator and swapper and pass through the pair of multiplexers.

16. A method for programming a ternary content-addressable memory (TCAM), the method comprising:

paring a plurality of predetermined rules;

identifying at least one commutable matching tuple in the predetermined rules;

actuating an extended key crafting logic based on the identified at least one commutable matching tuple; and programming the TCAM by consolidating symmetric rules based on the identified commutable matching tuple.

* * * * *